(12) United States Patent
Leslie

(10) Patent No.: US 6,232,694 B1
(45) Date of Patent: May 15, 2001

(54) STARTER GENERATOR WITH SLOTS IN THE COMMUTATOR HEAD ASSEMBLY

(76) Inventor: John Leslie, 4 Mary St., Miller Place, NY (US) 11764

(*) Notice: Subject to any disclaimer, the term of this patent is extended or adjusted under 35 U.S.C. 154(b) by 0 days.

(21) Appl. No.: 09/346,371

(22) Filed: Jul. 1, 1999

(51) Int. Cl.[7] ............................. H02K 13/00; H01R 39/26
(52) U.S. Cl. ................................. 310/233; 310/253
(58) Field of Search ................................ 310/253, 233, 310/60 A, 63, 252, 59, 251; 252/520.3; 475/162; 428/614; 29/597; 75/234; 318/542

(56) References Cited

U.S. PATENT DOCUMENTS

| | | | |
|---|---|---|---|
| 3,648,086 | * 3/1972 | Renner et al. | 310/63 |
| 4,142,120 | * 2/1979 | Hallerback | 310/59 |
| 4,142,138 | * 2/1979 | Taylor et al. | 318/542 |
| 4,204,863 | * 5/1980 | Schreiner | 75/234 |
| 4,580,333 | * 4/1986 | Griffis | 29/597 |
| 5,338,618 | * 8/1994 | Suzuki et al. | 428/614 |
| 5,876,298 | * 3/1999 | Kato et al. | 475/162 |

* cited by examiner

Primary Examiner—Nestor Ramirez
Assistant Examiner—Guillermo Perez
(74) Attorney, Agent, or Firm—Thomas A. O'Rourke; Wyatt, Gerber & O'Rourke

(57) ABSTRACT

This invention relates to improvements in electric power systems for aircraft and, more particularly, to such systems which provide both starter and generator functions. The present invention has particular applicability to starter generators for helicopters having a body with an end bell, a commutator head assembly and a fan cover assembly, and wherein the starter generator does not have an end bell that permits air to exhaust through said end bell. The starter generator of the present invention has a commutator head assembly having a frame with a top end and a base end, the top end being adapted to fit within the fan cover assembly and be retained therein by a suitable means, the commutator head assembly having with a plurality of slots that are designed to exhaust air flow passing over one or more brushes in the starter generator.

21 Claims, 10 Drawing Sheets

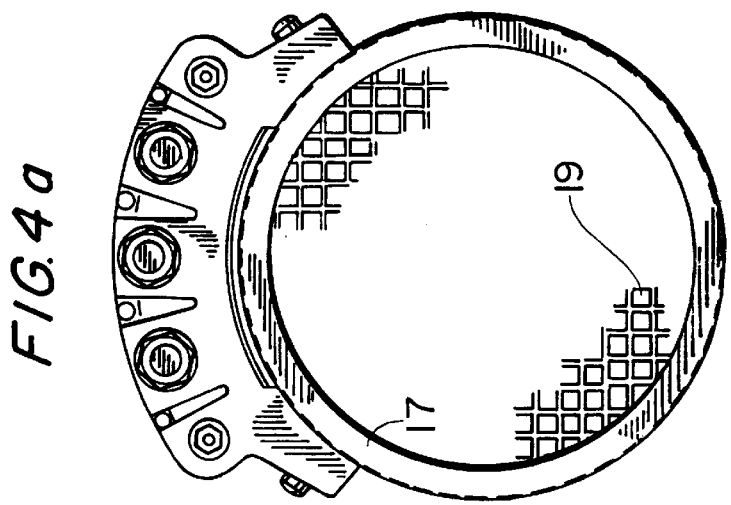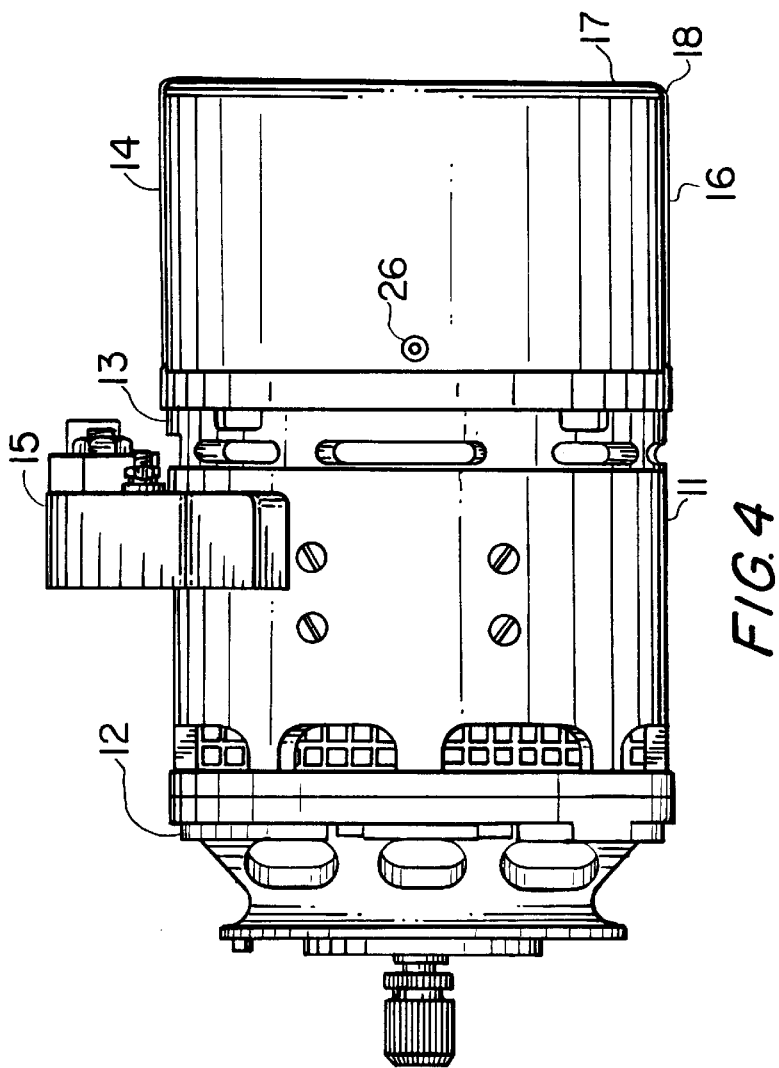

STARTER GENERATOR WITH SLOTS IN THE COMMUTATOR HEAD ASSEMBLY

BACKGROUND OF THE INVENTION

This invention relates to improvements in electric power systems for aircraft and, more particularly, to such systems which provide both starter and generator functions. The present invention has particular applicability to starter generators for helicopters.

Typically, in airborne electrical power generation systems, it is desirable to have a single system which provides both the starter and generator functions. The weight savings on an aircraft can be substantial when a dedicated starter is eliminated. For this reason, electrical power generating systems which are capable of providing engine start functions can provide both cost and weight savings.

The starter-generator commonly utilizes a machine that combines an induction motor with a synchronous generator. In this machine, a rotor-shaped stator is positioned inside a squirrel-cage induction rotor which has an array of magnets attached on the outer diameter thereof. The compound/dual machine operates as a starter by using the induction rotor to accelerate the permanent magnet rotor up to some low synchronous speed, where ac power can be applied to the outside stator of the synchronous-generator so as to lock-in the permanent magnet rotor synchronously with the rotating field created in the armature (stator) of the synchronous-generator.

Frequently, the weakest link in the design of a starter-generator is the brushes. The carbon brushes utilized in starter-generators wear rapidly when brush temperatures exceed 450 degrees F. During startup, the starter generator brush temperatures can exceed 800 to 1000 degrees F. or higher, thus significantly exceeding the 450 degree F. threshold for rapid wear. The life of the starter-generator is frequently governed by the life of the brushes. With the development of higher horsepower turbine engines the starter-generators utilized to start such engines have been experiencing rapid brush and armature commutator wear. Besides the cost of overhauling the starter generator after relatively short hours of use the rapid wearing of the brushes causes a build up of carbon dust inside the starter generator, in the engine compartment and outside on the cowling as well.

OBJECTS OF THE INVENTION

There is a particular need for improvements to a particular type of starter generator which is frequently used in helicopters. One common type of starter generator is a type sold by Aircraft Parts Corp. (APC) and also by Lucas and possibly by others. These starter generators are usually 150 amp generators and are characterized, because of the aircraft they are designed to be used on, as having a base that prevents the flow of air from exiting directly out the drive end of the starter generator. An example of this type of starter generator is shown in FIGS. 1 and 2. Because of their design, these generators have high maintenance and low hours between overhaul of the generator. These generators typically run hot and dirty, i.e., they generate high amounts of carbon dust due to the rapid wear of the brushes and this dust proliferates fouling the aircraft engine cowling and compartments. In addition, these generators also produce copper dust from wear to the armature commutator. This dust is a good conductor and can potentially create shorts in the starter-generator. Because of the rapid wear of the brushes due to the carbon itself and the high operating temperatures of the starter generators, the generators must be repaired and overhauled frequently at considerable cost and downtime.

Accordingly, it is an object of the present invention to provide improvements to starter generators that are designed such that air does not flow directly from the drive end of the starter generator.

It is an object of the present invention to provide an improved starter generator that requires low maintenance and has long brush life.

It is a another object of the invention to provide an improved starter generator housing that permits the starter generator to better withstand higher temperatures thereby improving brush life.

Another object of the present invention is to provide an improved brush spring design that reduces armature commutator and brush wear during operation of the starter generator.

A further object of the present invention is to provide a new brush composition and design that has provided longer brush life under diverse operating conditions.

BRIEF DESCRIPTION OF THE DRAWINGS

FIG. 4 is a side view of the starter generator of FIG. 1 with the improvements of the present invention.

FIG. 4A is an end view of the starter generator of FIG. 4.

DETAILED DESCRIPTION OF THE INVENTION

Figure 3A:
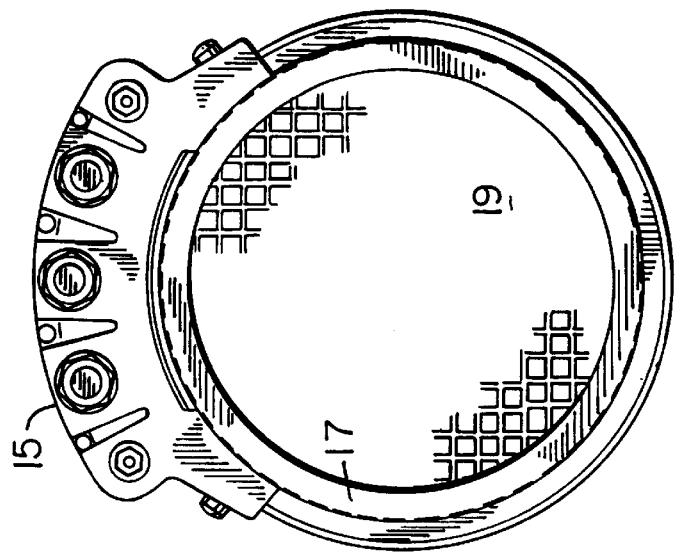
FIG. 3A is an air-in end view of the starter generator of FIG. 3.
Figure 3:
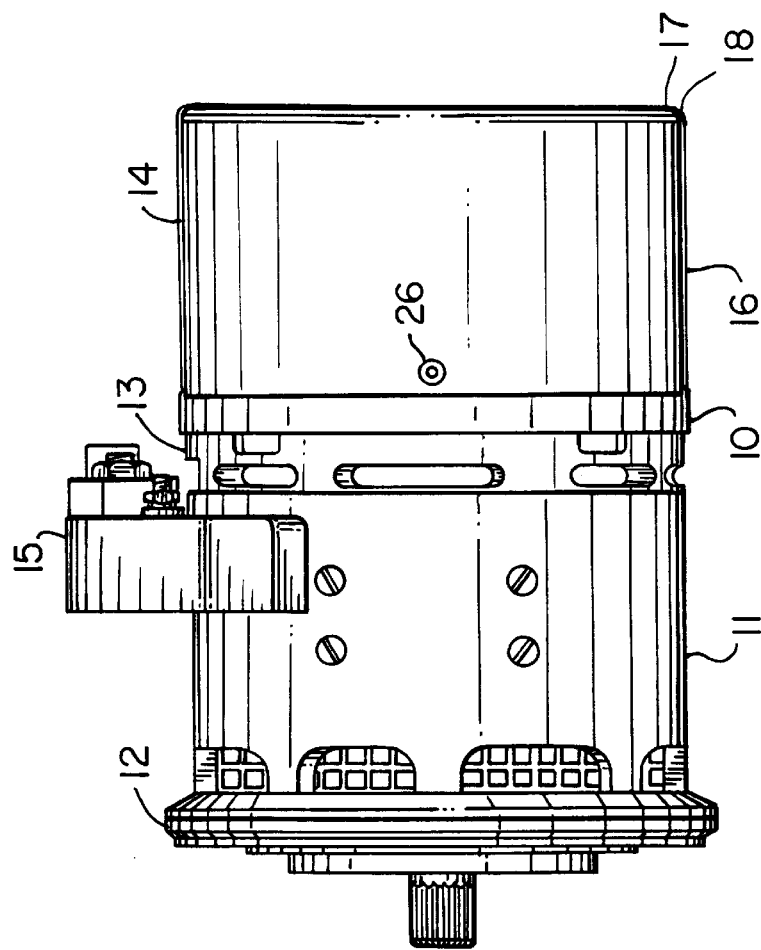
FIG. 3 is a side view of the starter generator of FIG. 1 with the improvements of the present invention.
Figure 6:
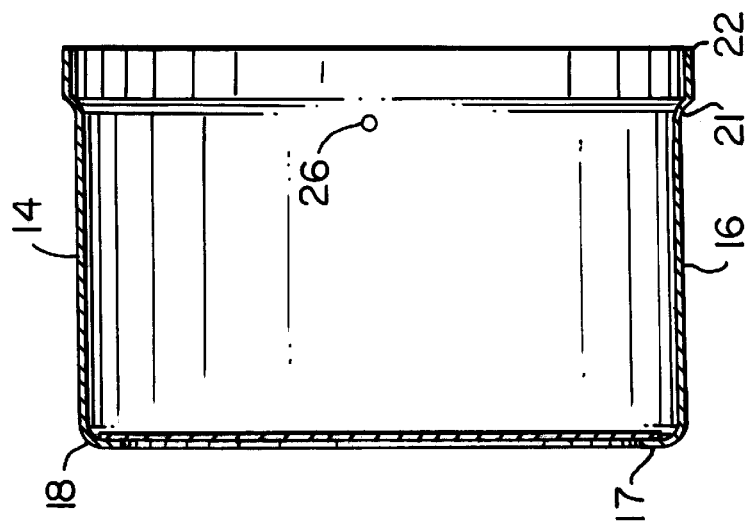
FIG. 6 is a side view of the fan cover assembly of FIG. 5.

As shown in FIGS. 3 and 4 there is a starter generator 10 having a body 11 with an end bell 12, a commutator head assembly 13 and a fan cover assembly 14. Attached to the body 11 is a block 15 for making the appropriate electrical connections. The fan cover assembly 14 has a cylindrical body 16 with an inwardly extending flange or lip 17 about the circumference of the body at one end 18 of the body 16. The fan cover assembly 14 has an air inlet screen 19 to protect the fan and provide ventilation to the generator. The screen is typically connected to the fan cover assembly 14 by spot welding or other suitable means at a plurality of locations 20 along lip 17 of the fan cover. At the opposite end of the body (FIG. 6), there is a shoulder portion 21 and skirt 22. The shoulder portion 21 and 22 are adapted to receive a portion of the commutator head assembly 13.

Figure 1A:
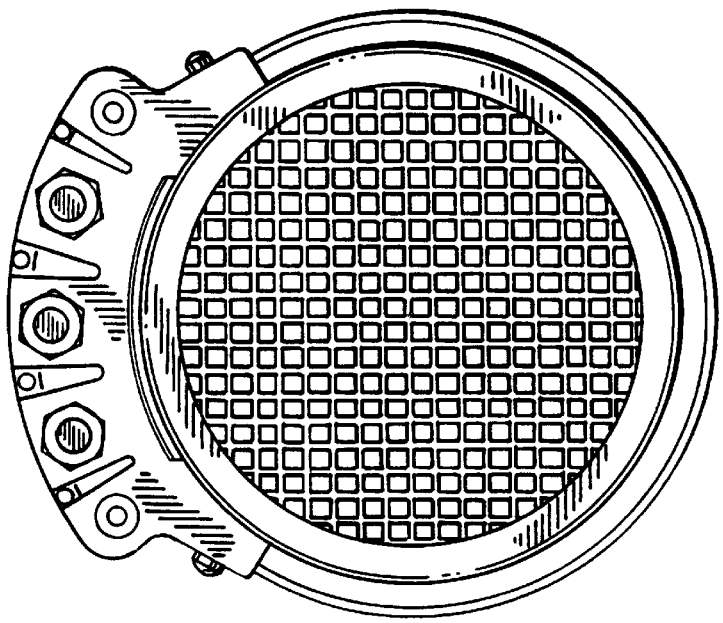
FIG. 1A is an end view of the starter generator of FIG. 1.
Figure 1:
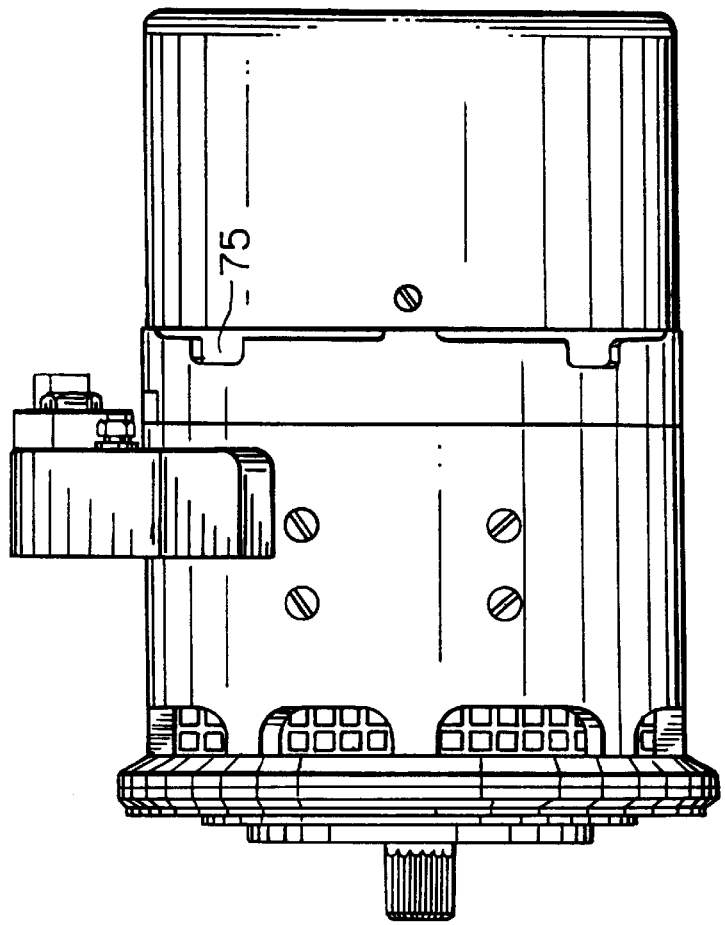
FIG. 1 is a side view of a prior art starter generator of the type manufactured by APC and Lucas. These generators are sold, for example, under the designations APC 150SG Series and Lucas (LSI)23032 Series and others.
Figure 2A:
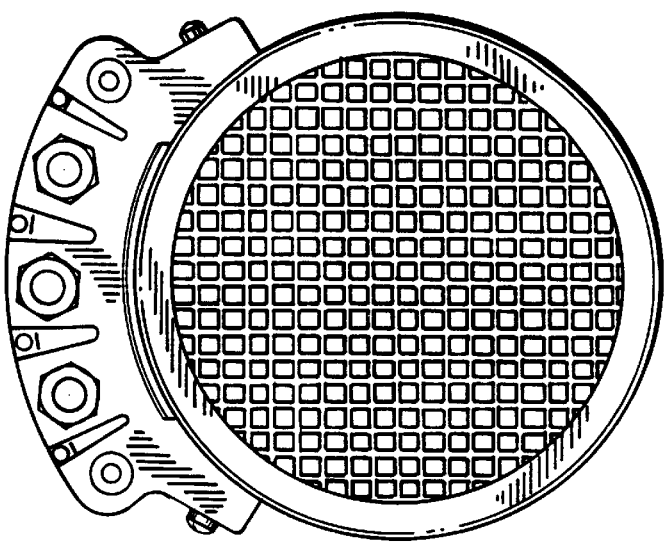
FIG. 2A is an end view of the starter generator of FIG. 2.
Figure 2:
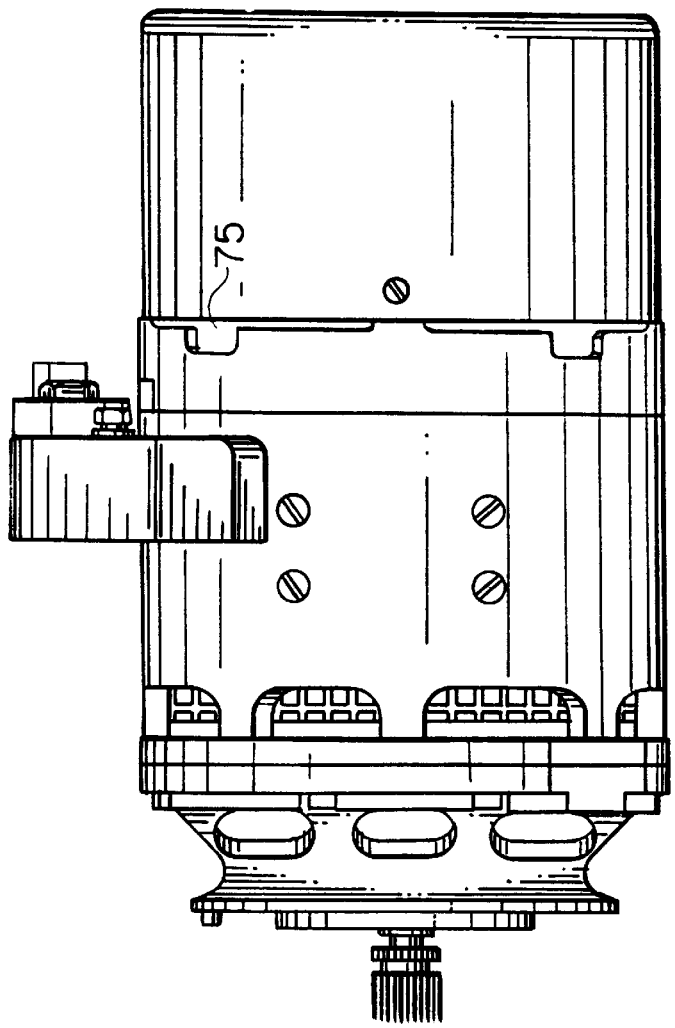
FIG. 2 is side view of an another prior art starter generator of the type manufactured by APC. These generators are sold under the designation, for example, APC 150SG122Q and others.
Figure 9B:
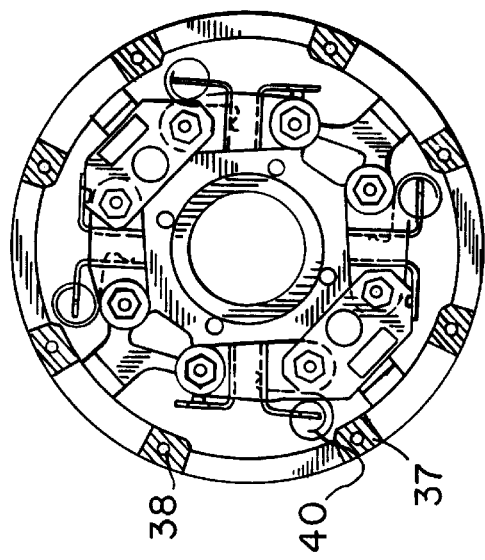
FIG. 9b is a view of the commutator head of FIG. 9 taken along B—B.
Figure 9A:
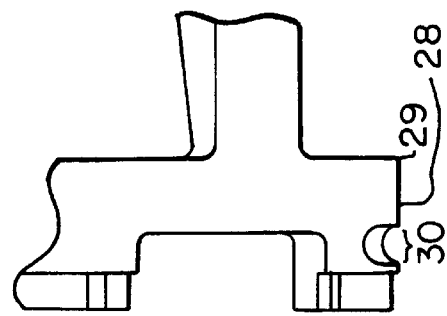
FIG. 9a is partial blown up view of the detail of area A of the commutator head of FIG. 9.

As shown in more detail in FIGS. 9a, 9b and 9c, commutator head assembly 13 has a frame 23 with a top end 24 and a base end 25. The top end 24 is adapted to fit within the fan cover assembly 14 and be retained therein by a suitable means such as screws that pass through screw holes 26 and 27 in the fan cover assembly 14 and commutator head assembly 13 respectively. The commutator head assembly has a side wall 28 at the base end 25 of the assembly. The side wall 28 has a upper portion 29 and a bottom portion 30. In the bottom portion 30 of the side wall are provided are a plurality of slots 31 that are designed and placed so that air flow past the brushes in brush holder 39 and exits the starter generator. The presence of the channels is a particular advantage with respect to the inside brush in the starter generator as it typically runs considerably hotter than the outside brush and wears out more frequently as a result. Although the starter generators of the prior art FIGS. 1 and 2 have air outlet areas 75 these air outlet areas are placed in a position in the prior art starter generators to inefficiently exhaust the air past the brushes to reduce their operating temperature.

The presence of the slots in their position in the present invention provides significant increase in brush life. Whereas prior art brushes had a life of only 100 to 300 hours, it is not uncommon for the starter generators of the present invention to have brushes with a useful life of 1500 hours or more. In addition, because of the high temperatures in the prior designs, lengthening the brushes to add additional brush wear surface did not add significantly to the life span of the brushes. However, with the present invention, lengthening the brush from a length of 1.060 inch to 1.210 inch, a mere 5/32 inch, increases the useful life of the brush by at least an additional 400 hours over and above the increase of over 1100 hours that the improvements of the present invention provide.

Figure 9:
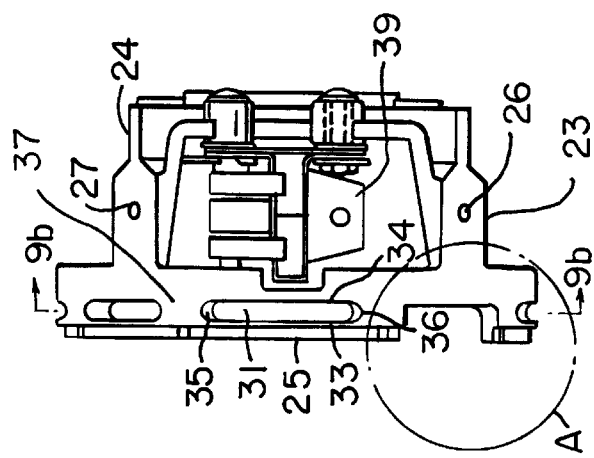
FIG. 9 is a side view of the commutator head assembly of the starter generator of the present invention.

As seen in the FIGS. 3, 4 and 9, the slots are generally oval in shape although other shapes are possible. The slots have a pair of generally parallel sides 33 and 34 which are joined together by U shaped end walls 35 and 36. By effeciently directing the air flow past the brushes, the high temperatures encountered by the brushes is considerably reduced thus decreasing wear and significantly extending brush life. The slots 31 are pass through the side wall 28 and because of the curvature of the commutator head assembly the opening on the outer edge of the sidewall is wider than the opening on the inner edge. The slots have a length at the outside of the side wall in the range of approximately 1.75 to 2.00 inches and a height in the range of approximately 0.200 to 0.250 inch. The slots have a length at the inside of the side wall in the range of approximately 1.50 to 1.75 inch and a height in the range of approximately 0.200 to 0.250. The length of each of the slots 31 should be as long as possible without unduly reducing the strength of support areas 37 which are adapted to receive a retaining means in orifice 38 for retaining the commutator head assembly in position with body 11.

Figure 10:
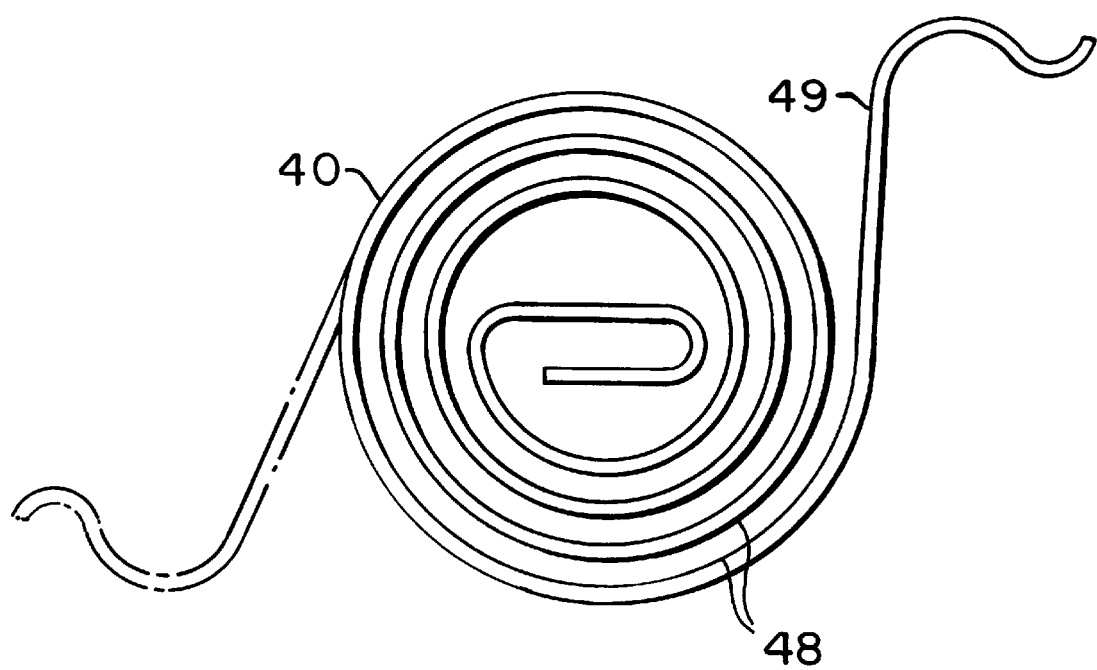
FIG. 10 shows the brush spring of the present invention.

The commutator head typically has a brush holder 39 for receiving and retaining the brushes in position and a plurality of brush springs 40 which provide the brushes with the proper tension (see FIGS. 9,10). The shoulder portion 21 and skirt 22 of the fan cover assembly 14 are adapted to receive a part of the upper portion 29 of the side wall of the commutator head assembly 13. However, the fan cover assembly should not extend over the opening of the slots 31. The position of the slots and their shape and size are such that they exhaust air entering the fan cover away from the brushes. Exhausting hot air reduces heat deterioration and wear of the armature/commutator and the brushes during operation.

Figure 5:
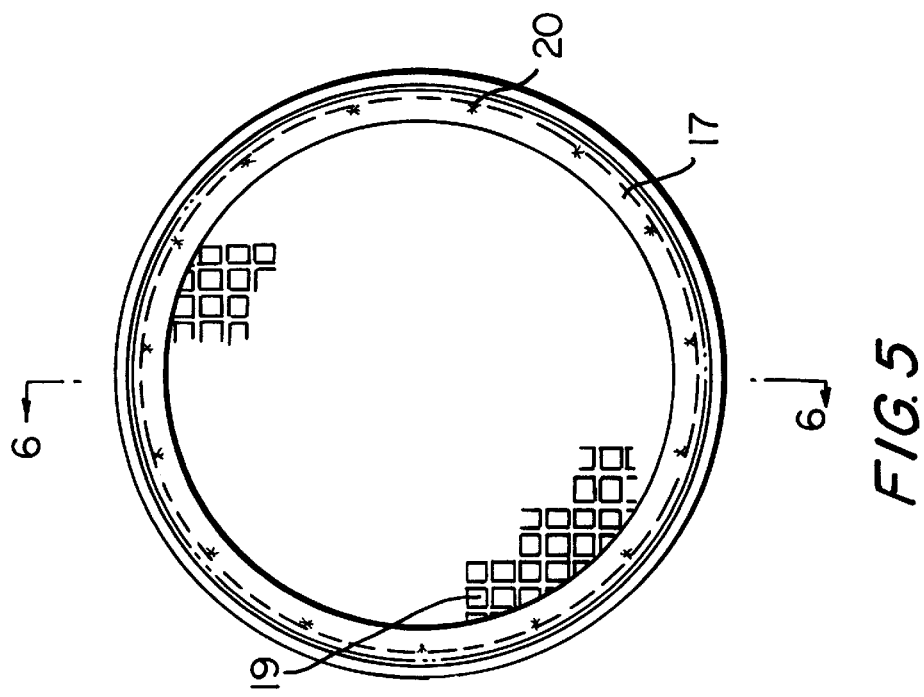
FIG. 5 is an end view of the fan cover assembly.
Figure 7A:
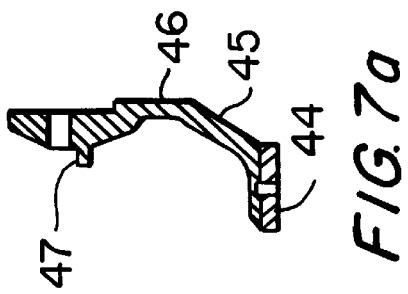
FIG. 7a is a cut away view of the end bell of FIG. 5 taken along section A—A.
Figure 7B:
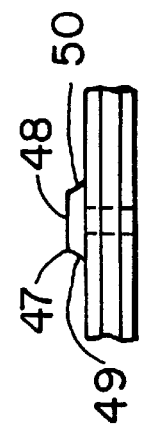
FIG. 7b is a side view of the end bell of FIG. 5 taken along section B—B.
Figure 7:
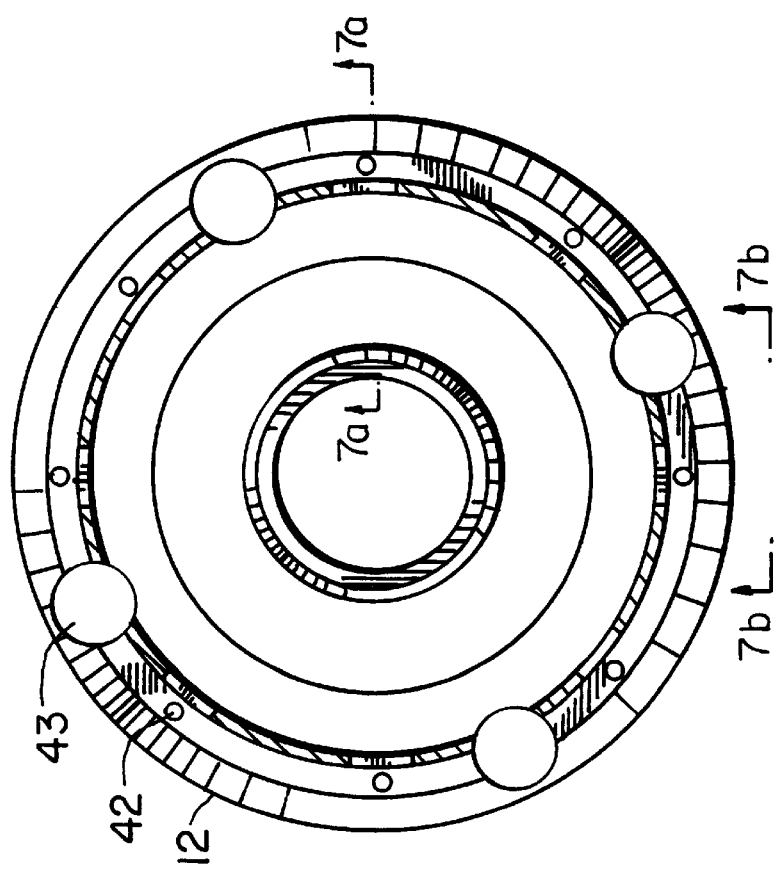
FIG. 7 is an end view of the drive end of an end bell of the starter generator of the present invention.
Figure 8A:
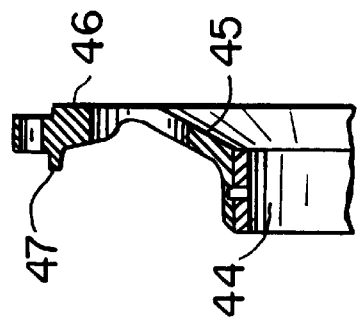
FIG. 8a is a cut away view of the end bell of FIG. 8 taken along section A—A.
Figure 8B:
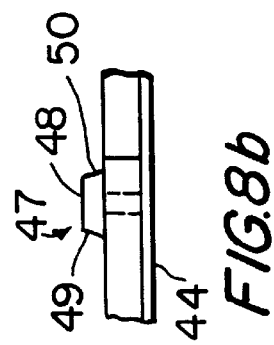
FIG. 8b is a side view of the end bell of FIG. 6 taken along section B—B.
Figure 8:
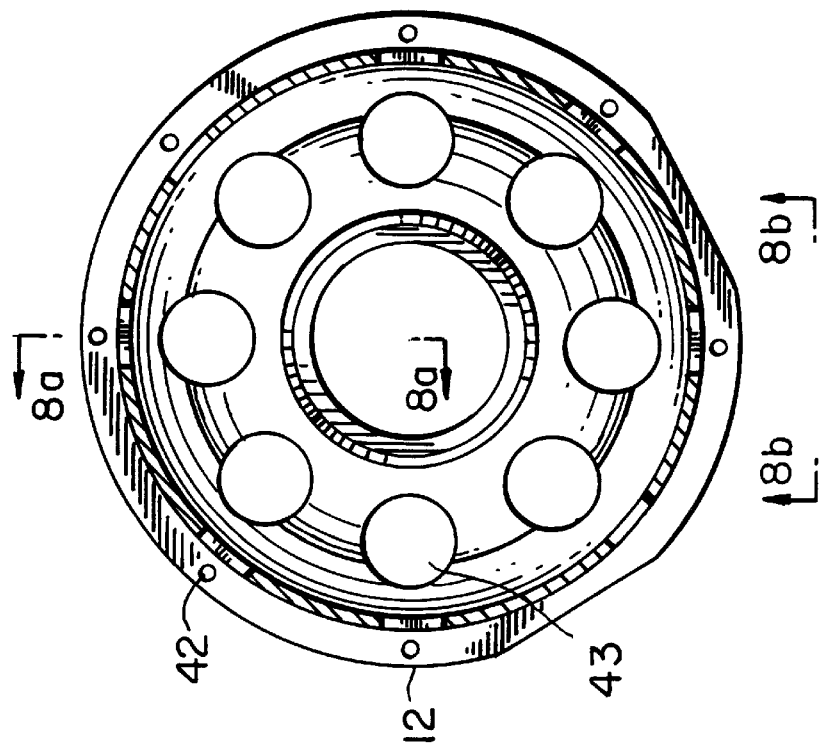
FIG. 8 is an end view of an alternate embodiment of an end bell of the starter generator of the present invention.

At the end 41 of the body 11 opposite the commutator head assembly 13 is an end bell 12. As shown in FIGS. 7 and 8 the end bell is generally disk shaped. The end bell of FIG. 7 is provided with a plurality of orifices 43 which provide clearance for bolts on the aircraft. In another end bell design, as shown in FIG. 8, the end bell has orifices added thereto to provide an additional area for air coming into from the fan cover to exit the area of the brushes. A second series of orifices 42 are used to attach the end bell to the body in both FIGS. 7 and 8. As seen in FIGS. 7a and 8a the end bell has a bearing liner 44. The bearing liner 44 is connected via a web 45 to side wall 46. Extending upwardly from sidewall 46 is support 47. The length of the support and sidewall is to be minimized so that the maximum air flow can be achieved through the orifices 57 in the body 11. The length of the cut out between the supports 47 should be approximately 1.75 to 2.00 inch. As seen in FIGS. 5B and 6B, support 47 extends up from the sidewall and has an upper surface 48 that is generally parallel to the bottom of the base. The side edges 49 and 50 of the support 47 may be perpendicular to the upper surface 48 or have a curvature as shown in FIGS. 7B and 8B. The support has a length of approximately 0.5" as measured along the upper surface 48. The height of the support is about 0.135" to 0.155".

Inside the commutator head 13 as noted above, are a plurality of brush springs 40. The brush springs 40 have the general shape depicted in FIG. 10. i.e.,a circular spring with a plurality of windings 48, In the prior art starter generators, the brush spring tension was high and the brushes were forced against the commutator. For example, the prior art brush spring had a tension force of 45–55 ounces or more. It has been found that the selection of the tension for the spring is critical for superior brush life and reduced armature commutator wear. Proper tension on the spring results in longer brush life. The tension is measured by holding the spring in the position where the solid lines are and then rotating the tension bar 49 through a maximum of 165°. The tension force should be as low as possible and may preferably be in the range of 20 to 28 ounces or lower. Preferably the brush spring should be made from a corrosion resistant material such as a stainless steel.

Figure 11B:
FIG. 11b shows the brush of FIG. 11 taken along A—A.
Figure 11A:
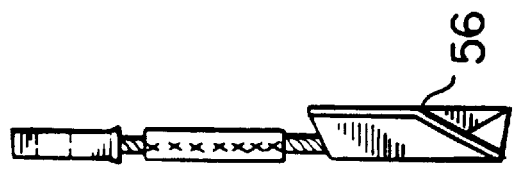
FIG. 11a shows a side view of the brush of the present invention.
Figure 11:
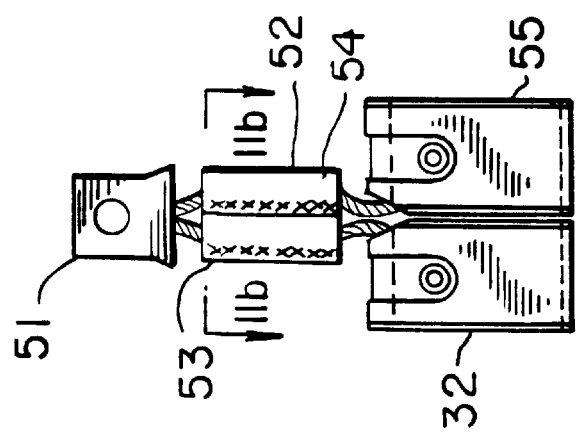
FIG. 11 shows the brush of the present invention.

FIG. 11 depicts a typical brush arrangement of the present invention. The brush has a terminal 51 that connects to the brush holder 39. Extending from the terminal 51 are a pair of shunts 52 and 53 with usually about seven strands. The strands are preferably sheathed in a silicone fiberglass sheath 54. The brush 55 is usually provided with a mark or groove 56 that is used to measure wear.

The brush is preferably comprised of the following composition:

Boron <0.002 preferably <0.001
Iron <0.015 preferably 0.01
Copper <0.002 preferably <0.001
Molybdenum <0.002 preferably <0.001
Magnesium <0.02 preferably <0.01
Silicon <0.015 preferably 0.01
Silver <0.60 preferably 0.56
Aluminum <0.002 preferably <0.001
Calcium <0.15 preferably <0.10
Phosphorous <0.02 preferably <0.01
Sulfur <0.02 preferably <0.01
Potassium <0.02 preferably <0.01
Nickel <0.002 preferably <0.001
Cobalt <0.002 preferably <0.001
Manganese <0.002 preferably <0.001
Titanium <0.002 preferably <0.001
Vanadium <0.002 preferably <0.001
Zinc <0.02 preferably <0.01
Lead <0.02 preferably <0.01
Lithium <2.0 preferably <1.0 most preferably about 0.50 to 0.60
Lithium carbonate <5.0 preferably <4 most preferably about 3.00 to 4.00

The remainder is carbon.

The brush length is usually about 1.06 long, however, because of the reduced spring tension and lower operating temperatures of the design of the present invention a brush length of 1.210 may be used. However, it will be appreciated that longer and shorter brush lengths may be used.

EXAMPLE 1

A starter generator made in accordance with the present invention was installed on a helicopter engine. At the same time a competing starter generator was installed on a similar helicopter. Both helicopters were in service for 100 hours of typical use. The engine compartment of the helicopter using the competing product had to be washed down frequently to remove carbon dust from the generator and engine compartment. The helicopter employing the present invention did not have to be so cleaned. After the 100 hours of use transpired the starter generators were inspected. The competing product was covered with carbon dust. The starter generator of the present invention was not. The brushes of both starter generators were examined after 100 hours of use. The competing starter generator had significant brush wear and was estimated to have only approximately 200 additional hours of wear remaining. The starter generator of the present invention had minimal wear and was estimated to have approximately 1700 hour of additional wear remaining based on the current rate of wear.

EXAMPLE 2

Table 1 depicts the brushes that are used in specific starter generators. The tension in the brush spring was obtained directly from the OEM Overhaul Manuals. The area of the brush that makes contact with the commutator was calculated and indicated in the table as "Brush Size per sq. in." Based on the tolerance of the brush spring tension and the area of the brush the low, average and high value of the pressure on the brush from the brush spring can be calculated. The average brush spring pressure on the starter generators of the present invention is 119.65 oz/sq. in. The average brush spring pressure on the prior art starter generators is 199 oz/sq. in. causing OEM brushes to typically last a maximum of approximately 300 hours between brush changes. Brush spring tension is determined by the following formula:

$$Stress \times Area = Force$$

119.65 oz/sq. in.×0.201 sq. in.=24.05 oz average

Using Table 1 the tension for the brush spring can be calculated to match the desired tension in a known brush spring. If the size of the brush is known i.e., N1829-1 Brush=0.201 sq. in. ,then the tension on the brush spring is:

119.65 oz/sq. in.×0.201 sq. in.=24.05 oz.

I claim:

1. In a starter generator for a helicopter having a body with an end bell, a commutator head assembly having a sidewall with an upper portion and a bottom portion, said sidewall having one or more air outlets in the upper portion of the sidewall in said commutator head assembly and a fan cover assembly, the improvement comprising a commutator head assembly having a frame with a top end and a base end, the top end being adapted to fit within the fan cover assembly and be retained therein by a suitable means, the commutator head assembly having a plurality of slots in the bottom portion of said sidewall of said commutator head assembly that are designed to exhaust air flow passing over one or more brushes in the starter generator.

2. The starter generator according to claim 1 wherein the fan cover assembly has a generally cylindrical body with a fan cover at one end of the body and a skirt at the opposite end of the body for receiving the commutator head assembly and wherein air entering the interior of the commutator head assembly through the fan assembly passes over one or more brushes of a motor before exiting through the slots in the bottom portion of the side wall of the commutator assembly.

3. The starter generator according to claim 2 wherein the slots are generally oval in shape.

4. The starter generator according to claim 3 wherein the side wall has an inside surface and an outside surface and wherein the slots have a length at the outer surface of the side wall in the range of approximately 1.75 to 2" and a height in the range of approximately 0.2 to 0.25" and wherein the slots have a length at the inner surface of the side wall in the range of approximately 1.5 to 1.75" and a height in the range of approximately 0.2 to 0.25".

5. The starter generator according to claim 2 wherein the slots have a top surface and a bottom surface that are generally parallel to each other and a pair of generally curved side walls.

6. The starter generator according to claim 3 wherein the slots have a pair of generally parallel sides which are joined together by U shaped end walls.

7. The starter generator according to claim 1 wherein the body has a plurality of orifices located where the body is connected to the end bell and the end bell has a base and a shoulder extending upwardly from said base and a side wall connected to said shoulder, said sidewall ending in a plurality of supports, wherein said supports permit the end bell to be connected to said body without blocking orifices in the body.

8. The starter generator according to claim 7 wherein the support has a length of approximately 0.5" measured along an upper surface and a height of about 0.135" to 0.155".

9. The starter generator according to claim 1 wherein the brushes comprise the following percentages by weight
Boron <0.002
Iron <0.015
Copper <0.002
Molybdenum <0.002
Magnesium <0.02
Silicon <0.015
Silver <0.60
Aluminum <0.002
Calcium <0.15
Phosphorous <0.02
Sulfur <0.02
Potassium <0.02
Nickel <0.002
Cobalt <0.002
Manganese <0.002
Titanium <0.002
Vanadium <0.002
Zinc <0.02
Lead <0.02
Lithium <2.0
Lithium carbonate <5.0
and wherein the remainder is carbon.

10. The starter generator according to claim 1 wherein the brushes comprise the following percentages by weight
Boron <0.001
Iron $\leq$0.01
Copper <0.001
Molybdenum <0.001
Magnesium <0.01
Silicon $\leq$0.01
Silver $\leq$0.56
Aluminum <0.001
Calcium <0.10
Phosphorous <0.01
Sulfur <0.01
Potassium <0.01
Nickel <0.001
Cobalt <0.001
Manganese <0.001
Titanium <0.001
Vanadium <0.001
Zinc <0.01
Lead <0.01
Lithium <1.0
Lithium carbonate <4
and wherein the remainder is carbon.

11. The starter generator according to claim 8 wherein the brush spring has a tension on a commutator of less than 20 ounces.

12. The starter generator according to claim 10 wherein the percentage of Lithium by weight is about 0.50 to 0.60.

13. The starter generator according to claim 12 wherein the percentage of Lithium carbonate by weight is about 3.00 to 4.00.

14. The starter generator according to claim 1 further comprising a brush spring having a tension on a commutator of less than 40 ounces.

15. The starter generator according to claim 1 wherein a brush spring has a tension on a commutator of less than 28 ounces.

16. A starter generator for a helicopter according to claim 1 having one or more brush springs wherein the brush spring has a tension on a commutator of less than 40 ounces.

17. The starter generator according to claim 1 having one or more brush springs wherein the brush spring has a tension on a commutator of less than 28 ounces.

18. The starter generator according to claim 1 having one or more brush springs wherein the brush spring has a tension on a commutator of less than 20 ounces.

19. A starter generator having one or more brushes wherein the brushes comprise the following percentages by weight:
Boron <0.002
Iron <0.015
Copper <0.002
Molybdenum <0.002
Magnesium <0.02
Silicon <0.015
Silver <0.60
Aluminum <0.002
Calcium <0.15
Phosphorous <0.02
Sulfur <0.02
Potassium <0.02
Nickel <0.002
Cobalt <0.002
Manganese <0.002
Titanium <0.002
Vanadium <0.002
Zinc <0.02
Lead <0.02
Lithium <2.0
Lithium carbonate <5.0
and wherein the remainder is carbon.

20. A method of improving brush wear in a starter generator for a helicopter, said starter generator having a body with an end bell, a commutator head assembly having a sidewall with an upper portion and a bottom portion, said sidewall having one or more air outlets in the upper portion of the sidewall in said commutator head assembly and a fan cover assembly, and wherein the starter generator does not have an end bell that permits air to exhaust through said end bell, and wherein the commutator head assembly has a frame with a top end and a base end, the top end being adapted to fit within the fan cover assembly and be retained therein by a suitable means, the method comprising the steps of providing the commutator head assembly with a plurality of slots in the bottom portion of said sidewall of said commutator head assembly that are designed to exhaust air flow passing over one or more brushes in the starter generator.

21. A starter generator for a helicopter comprising
a body with an end bell,
a commutator head assembly having a sidewall with an upper portion and a bottom portion, said sidewall having one or more air outlets in the upper portion of the sidewall in said commutator head assembly and
a fan cover assembly, and wherein the commutator head assembly comprises a frame with a top end and a base end, the top end being adapted to fit within the fan cover assembly and be retained therein by a suitable means, the commutator head assembly having a plurality of slots in the bottom portion of said sidewall of said commutator head assembly that are designed to exhaust air flow passing over one or more brushes in the starter generator.

* * * * *